United States Patent
Lacey

(10) Patent No.: US 6,852,150 B2
(45) Date of Patent: Feb. 8, 2005

(54) MOLDED CORE FILTER DRIER

(75) Inventor: Michael G. Lacey, Marthasville, MO (US)

(73) Assignee: Sporlan Valve Company, Washington, MO (US)

( * ) Notice: Subject to any disclaimer, the term of this patent is extended or adjusted under 35 U.S.C. 154(b) by 0 days.

(21) Appl. No.: 10/057,207

(22) Filed: Jan. 25, 2002

(65) Prior Publication Data

US 2003/0140791 A1 Jul. 31, 2003

(51) Int. Cl.$^7$ .......................... B01D 29/00; F25B 43/00
(52) U.S. Cl. ..................... 96/108; 55/491; 55/495; 55/514; 62/474; 210/DIG. 6; 210/DIG. 7
(58) Field of Search ..................... 96/108, 147; 55/490, 55/491, 495, 514, DIG. 5; 62/474; 206/204; 210/282, 446, 496, DIG. 6, DIG. 7

(56) References Cited

U.S. PATENT DOCUMENTS

| | | | |
|---|---|---|---|
| 1,866,659 A | 7/1932 | Litle, Jr. ..................... | 210/689 |
| 2,148,770 A | 2/1939 | Mittendorf .................. | 210/131 |
| 2,548,965 A | 4/1951 | Gaugler ....................... | 210/164 |
| 2,551,426 A | 5/1951 | Eaker .......................... | 62/170 |
| 2,556,292 A | 6/1951 | Neweum .................... | 183/4.8 |
| 3,025,233 A * | 3/1962 | Figert ....................... | 210/502.1 |
| 3,838,578 A | 10/1974 | Sakasegawa et al. ......... | 62/125 |
| 4,266,408 A | 5/1981 | Krause ........................ | 62/474 |
| 4,320,000 A * | 3/1982 | Lange et al. ................ | 210/117 |
| 4,474,661 A * | 10/1984 | Nearpass et al. ........... | 210/437 |
| 4,908,132 A | 3/1990 | Koval et al. ................ | 210/446 |
| 4,954,252 A * | 9/1990 | Griffin et al. .............. | 210/136 |
| 5,179,780 A | 1/1993 | Wintersteen et al. ..... | 29/890.07 |
| 5,435,153 A | 7/1995 | Hutchison et al. ........... | 62/474 |
| 5,440,898 A | 8/1995 | Starr ........................... | 62/474 |
| 5,562,427 A | 10/1996 | Mangyo et al. ............. | 417/313 |
| 6,167,720 B1 | 1/2001 | Chisnell ...................... | 62/474 |
| 6,381,983 B1 * | 5/2002 | Angelo et al. ............... | 62/474 |

FOREIGN PATENT DOCUMENTS

| | | | |
|---|---|---|---|
| JP | 8-86542 A | * | 4/1996 |
| JP | 8-121909 | * | 5/1996 |

* cited by examiner

Primary Examiner—Frank M. Lawrence
(74) Attorney, Agent, or Firm—Polster, Lieder, Woodruff & Lucchesi, L.C.

(57) ABSTRACT

This filter-drier for removing moisture from a refrigerant includes a casing having an inlet for receiving refrigerant, an outlet for discharging refrigerant and a molded core, formed from dessicant and a binder, and disposed in the casing between the inlet and the outlet and receiving refrigerant flow therethrough. The molded core includes an outer surface at least in part engaging the inner surface of the casing. The core is held within the casing against axial movement by bonding with the casing or by an indentation protruding into the core or both.

10 Claims, 2 Drawing Sheets

MOLDED CORE FILTER DRIER

BACKGROUND OF THE INVENTION

This invention relates generally to filter-driers for refrigeration systems and particularly to a casing and a molded filter-drier core having superior structural characteristics of attrition resistance, strength and permeability while being held firmly in place by structural cooperation between the casing and the core.

Filter-driers are used in refrigeration systems to filter solid contaminants and to remove soluble contaminants from the refrigerant and lubricant. The three general types of construction of filter-driers are loose fill, compacted bead, and molded core.

In a loose fill design, the desiccant is captured within mesh screens to prevent the desiccant beads from escaping into the system. The beads form a desiccant bed trapped between the shell and mesh screens, however, within the desiccant bed the beads are only loosely held. Flow of refrigerant through the desiccant bed or vibration of the filter-drier shell from other sources results in undesirable movement of the individual beads within the bed. Contact of the desiccant beads with the shell, mesh screens, or other desiccant beads can lead to attrition of the desiccant beads. As attrition of the beads progresses, the desiccant fines escape the mesh screens and circulate in the refrigerating system.

Compacted bead designs use desiccant beads similar to the loose fill design but incorporates perforated metal and mesh screens, filter pads, and springs to compact the desiccant bed. The compaction of the desiccant bed restricts the movement of the individual beads compared to a loose fill design and reduces the risk of attrition, however, this design does not eliminate attrition.

A molded core unit consists of a molded desiccant block held in place with support screens, filter pads, and springs. The molded core is made of smaller granules of desiccant than the loose fill or compacted bead design. The desiccant granules are bonded together using an organic or inorganic binder to form a solid shape. This design prevents attrition of the desiccants by not allowing movement of the granules.

Typically, shells to contain the desiccants in a filter-drier are either welded steel shell consisting of steel tubing and/or stamped pieces welded together to form a sealed shell. Alternatively, copper spun shells may be used in which copper tubing is reduced to a specific fitting size. Prior to welding a steel shell or spinning to reduce the diameter of the copper tubing, the internal parts consisting components such as perforated screens, mesh screens, filter pads, desiccant, and springs are assembled. The purpose of the screens and springs is to contain the desiccant beads or desiccant core.

Known filter-drier units having molded cores are disclosed in U.S. Pat. Nos. 2,556,292, 5,440,898, 5,562,427 and 2,551,426. 2,556,892 discloses a core formed from molded discs and U.S. Pat. No. 5,440,898 disclosed a molded core which is strengthened by the use of fibers. In both cases, the core is spaced from an outer metal casing and held in place by a lateral support system at each end. U.S. Pat. No. 5,562,427 discloses a copper casing with longitudinally spaced grooves formed to hold a preformed solid core. The grooves are formed by the drawing process but at each end of the core. U.S. Pat. No. 2,551,426 discloses a preformed block of drying agent which is supported by longitudinally spaced internal protrusions.

The present system overcomes the need for support systems for holding the core in place in a manner not disclosed in the known prior art.

SUMMARY OF THE INVENTION

This molded core filter does not require additional parts to hold the core in place within the casing and the core is formed within the casing and held within the casing by structural cooperation between the casing and the core. The binder used in the molded core serves to bind the desiccants together and, in addition, binds the desiccant core to the casing. Thus movement between the core and the casing is prevented thereby substantially eliminating desiccant attrition.

This filter-drier is for drying refrigerant circulated in a refrigeration system by removing moisture therefrom, and comprises a casing having an inlet for receiving refrigerant, and an outlet for discharging refrigerant. The casing includes opposed end portions and an intermediate portion disposed between said end portions and having an inner surface. A molded core is provided disposed in said casing between said inlet and outlet and receiving flow of refrigerant therethrough and holding means is provided between the casing inner surface and said core outer surface for holding the core in place within the casing.

It is an aspect of this invention to provide that the holding means includes at least one protrusion from the inner surface of the casing engaging the outer surface of the core to inhibit axial movement of the core.

It is another aspect of this invention to provide that the holding means includes bonding means between the inner surface of the casing and the outer surface of the core to inhibit axial movement of the core.

It is yet another aspect of this invention to provide that the protrusion is circular and extends into the outer surface of the core.

It is still another aspect of this invention to provide that the casing includes a cylindrical intermediate portion and the opposed end portions are funnel shaped.

It is an aspect of this invention to provide that the core includes a cylindrical portion.

It is another aspect of this invention to provide that the core includes a frusto-conical portion and a passage having a closed end proximate the inlet and an open end portion proximate the outlet.

It is yet another aspect of this invention to provide that the cylindrical portion of the core is bonded to the cylindrical portion of the casing.

It is another aspect of this invention to provide that the core is formed from molded desiccant and a binder.

This invention provides a method of manufacturing a filter-drier having a tubular casing and a desiccant core between an inlet and an outlet the method comprising the steps of forming an indentation in the tubular casing; and molding the desiccant core within the tubular casing around the indentation to conform to the configuration of the indentation thereby holding the core in place and another aspect to bond the core to the casing thereby additionally holding the core in place.

It is an aspect of this invention to provide that the method includes the additional step of forming the core with a passage having a closed end adjacent the inlet and an open end adjacent the outlet and another aspect to provide the additional step of forming the indentation as a U-shaped circular groove.

It is another aspect of the invention to provide that the method includes forming the tubular casing from sections of an elongate tube and forming the indentations before cutting the tube into sections and reducing at least one of the section ends by metal spinning following the core molding procedure.

This filter-drier is relatively inexpensive and simple to manufacture and is particularly effective for its intended purpose.

DESCRIPTION OF THE PREFERRED EMBODIMENT

Figure 1:
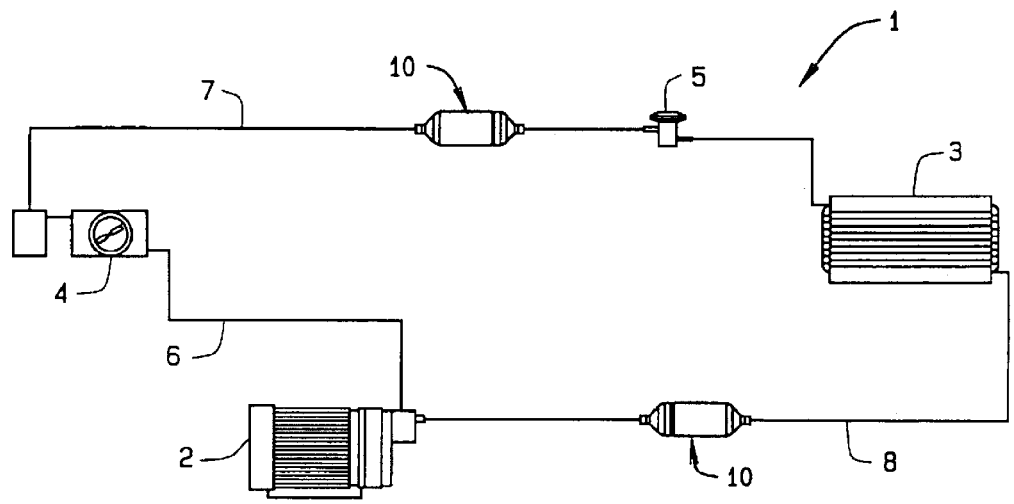
FIG. 1 is a diagrammatic view of a refrigeration system utilizing a filter-drier assembly in the liquid line and in the suction line.
Figure 2:
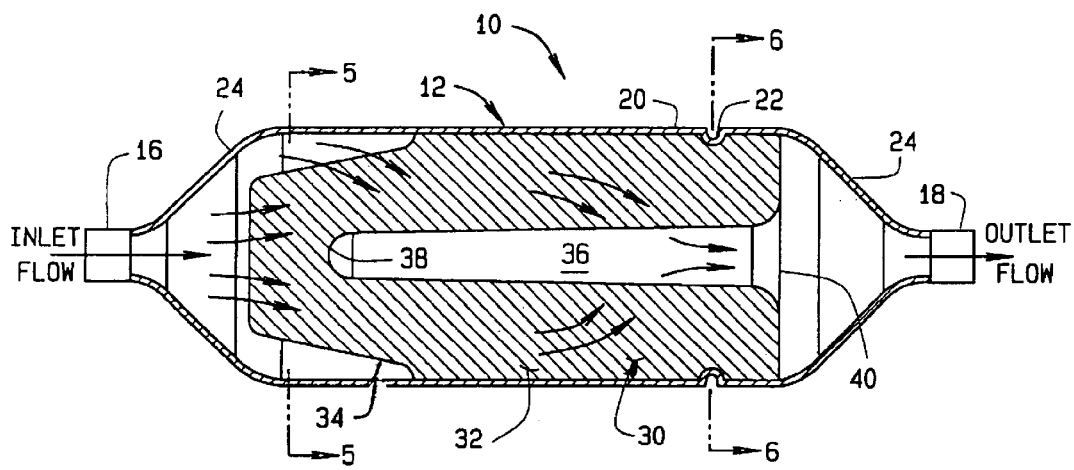
FIG. 2 is a longitudinal cross-sectional view of the filter-drier assembly.

Referring now by reference numerals to the drawings and first to FIG. 1, it will be understood that one or more filter-drier assemblies 10 are used in a refrigeration system 1 which includes a compressor 2, an evaporator 3, a condenser 4 and an expansion device 5 such as a thermostatic expansion valve.

In the embodiment shown, a hot gas line 6 is provided between the compressor 2 and the condenser 4. A liquid line 7 is provided between the condenser 4 and the expansion device 5 and a suction line 8 is provided between the evaporator 3 and the compressor 2. A first filter-drier assembly 10 is disposed in line 7 between the condenser 4 and the expansion device 5. Also, in the embodiment shown, a second filter-drier assembly 10 is disposed in the suction line 8 between the evaporator 3 and the compressor 2.

Figure 3:
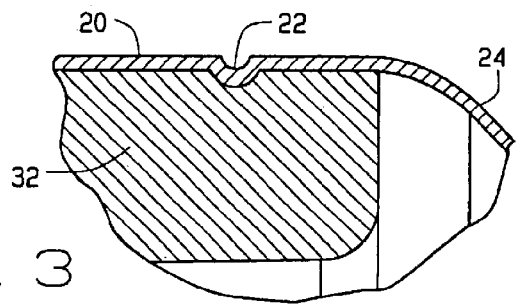
FIG. 3 is an enlarged fragmentary view of the holding indentation.
Figure 4:
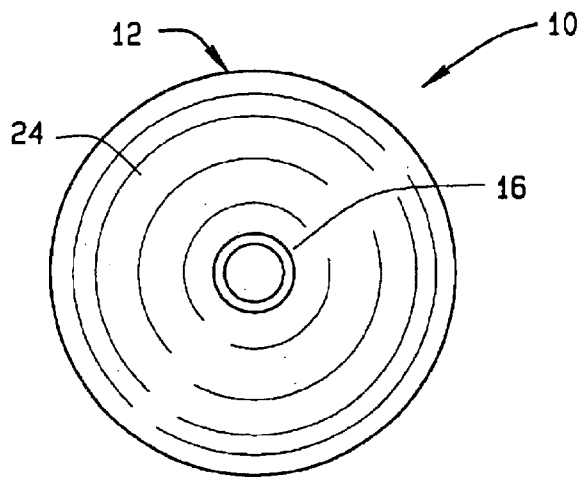
FIG. 4 is an end view of the filter-drier assembly.
Figure 5:
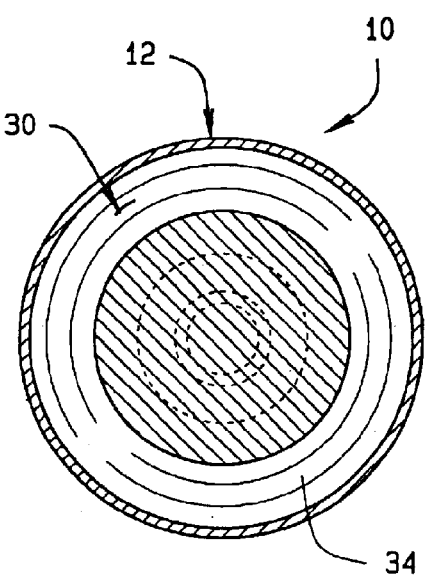
FIG. 5 is a cross-sectional view taken on line 5—5 of FIG. 2.
Figure 6:
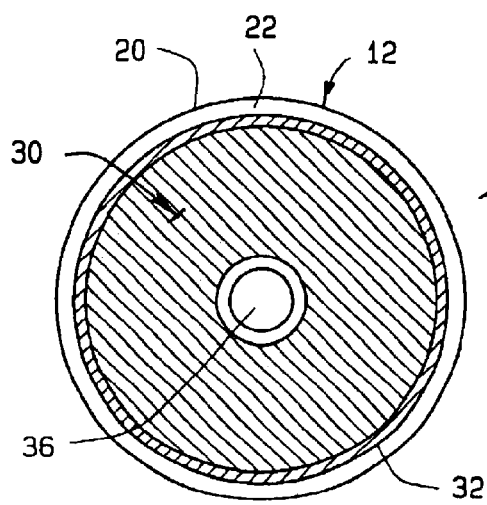
FIG. 6 is a cross-sectional view taken on line 6—6 of FIG. 2.

More specifically, the filter-drier assembly 10 includes a casing 12 and a molded core 30. The casing 12 includes inlet and outlet nozzle fittings 16 and 18, and a cylindrical intermediate portion 20. As shown in FIGS. 3 and 6, the intermediate portion 20 includes an inwardly protruding U-shaped circular indention 22, located closer to the outlet 18 than the inlet 16, in the embodiment shown, and opposed funnel-shaped transition portions 24.

The molded core 30 is disposed within the casing 12 and includes a cylindrical portion 32 disposed in engaging relation to the cylindrical casing portion 20. The molded core 30 may also include a frusto-conical portion 34 at the inlet end spaced from the casing and a passage 36 having a closed end 38 and an open end 40 disposed at the outlet end of the casing.

The permeable molded desiccant core 30 includes a binder and is molded in place within the casing after formation of the circular indentation 32 but before the transition portions 24 are formed. In the embodiment shown, the relatively short tubular casings 12 may be provided by sections cut from a relatively long copper tube. In this case the indentations may be created in the elongate tube prior to cutting the tube into sections. Also, in the embodiment shown, the tubular casing is formed of copper and the transition portions are created by the metal spinning process. The core 30 is molded in place and the cylindrical portion 32 of the core outer surface is in adhering contact engagement with the inside wall of the cylindrical casing portion 12 after the core is molded. Because of this structural arrangement of parts, the circular indentation 22 is molded into the core material which is molded in place about the indentation. Following the core molding procedure the casing transition portions 24 are reduced to the generally funnel-shaped configuration shown and the inlet and outlet fittings 14 and 16 are emplaced at opposite ends.

With the structural arrangement of casing and core parts shown, the molded core is held in place by bonding between the outer surface of the core and the inner surface of the casing, said bonding constituting a holding means. In addition, the provision of the circular indentation 22 holds the core in place mechanically by the tongue and groove effect between the casing 12 and the molded core 30 and constitutes another holding means. Thus, the core may be held by one of two holding means or by both holding means.

Molding the desiccant core around the indentation utilizes the strength of the molded core and greatly increases the force required to move the core 30 within the casing 12. In the event that the bond between the molded core and the casing, which is provided by the binder, is destroyed during the production process or during installation, the mechanical retention provided by the indentation is sufficient to prevent movement of the core within the casing.

The configuration and permeability of the molded core are optimized to ensure sufficient refrigerant flow characteristics, desiccant core weight and filtration performance.

In operation, refrigerant flowing through the system is received into the casing at the inlet 16, and enters the core 30 at the surface provided by the frusto-conical portion 34. The refrigerant enters the passage 36 through the core frusto-conical portion 34 and the cylindrical portion 32 as indicated by the arrows and is discharged at the outlet 18. It will be understood that while the frusto-conical portion 34 has some advantage in that a greater surface area is provided for receiving the refrigerant, the core 30 may be formed without a frusto-conical end.

The invention has been described by making reference to a preferred filter-drier core construction. However, the details of description are not to be understood as restrictive, numerous variants being possible with the principles disclosed and within the fair scope of the claims hereunto appended.

I claim as my invention:

1. A filter-drier for drying refrigerant circulated in a refrigeration system by removing moisture therefrom, the filter-drier comprising:

a casing having an inlet for receiving refrigerant and an outlet for discharging refrigerant, the casing including opposed end portions and an intermediate portion disposed between said end portions and having an inner surface;

a molded core formed from dessicant and a binder and being disposed in said casing between said inlet and outlet and having an outer surface and receiving flow of refrigerant therethrough; and holding means between the casing inner surface and said core outer surface for holding the core in place, the holding means including bonding means between the inner surface of the casing and the outer surface of the core to inhibit axial movement of the core, the bonding means being provided by the dessicant core binder.

2. A filter-drier for drying refrigerant circulated in a refrigeration system by removing moisture therefrom, the filter-drier comprising:

a casing having an inlet for receiving refrigerant and an outlet for discharging refrigerant, the casing including opposed end portions and an intermediate portion disposed between said end portions and having an inner surface;

a molded core formed from dessicant and a binder and being disposed in said casing between said inlet and outlet and having an outer surface and receiving flow of refrigerant therethrough; and holding means between the casing inner surface and said core outer surface for holding the core in place, the holding means including at least one preformed protrusion on the casing engaging the outer surface of the core to inhibit axial movement of the core;

the casing including a cylindrical portion;

the core including a cylindrical portion; and the cylindrical portion of the core being bonded to the cylindrical portion of the casing by the molded core binder.

3. A filter-drier for drying refrigerant circulated in a refrigeration system by removing moisture therefrom, the filter-drier comprising:

a casing having an inlet for receiving refrigerant and an outlet for discharging refrigerant, the casing including opposed end portions and an intermediate portion disposed between said end portions and having an inner surface;

a molded core formed from dessicant and a binder and being disposed in said casing between said inlet and outlet and having an outer surface and receiving flow of refrigerant therethrough; and holding means between the casing inner surface and said core outer surface for holding the core in place, the holding means including at least one preformed protrusion on the casing engaging the outer surface of the core to inhibit axial movement of the core;

the core being formed from molded desiccant and a binder the binder providing at least part of the holding means bonding the core to the casing.

4. A method of manufacturing a filter-drier having a tubular casing and a desiccant core between an inlet and an outlet comprising the steps of:

forming an indentation in the tubular casing, and molding a desiccant core within the tubular casing around the indentation to conform to the configuration of the indentation.

5. A method of manufacturing a filter-drier as defined in claim 4, comprising the additional step of:

forming the core with a passage having a closed end adjacent the inlet and an open end adjacent the outlet.

6. A method of manufacturing a filter-drier as defined in claim 4 comprising the additional step of:

forming the indentation as a U-shaped circular groove.

7. A method of manufacturing a filter-drier having a tubular casing and a desiccant core between an inlet and an outlet comprising the steps of:

dividing an elongate tube into sections;

forming indentations in each section;

cuffing each section to provide a plurality of tubular casings, having opposed ends; and molding a desiccant core within each tubular casing to conform to the configuration of the indentation.

8. A method of manufacturing a filter-drier as defined in claim 7, comprising the additional step of:

reducing at least one of the ends of each tubular section by metal spinning into a funnel shaped configuration.

9. A filter-drier for driving refrigerant circulated in a refrigeration system by removing moisture therefrom, the filter-drier comprising:

a casing having an inlet for receiving refrigerant and an outlet for discharging refrigerant, the casing including opposed end portions and an intermediate portion disposed between said end portions and having an inner surface;

a molded core formed from dessicant and a binder disposed in said casing between said inlet and outlet and receiving flow of refrigerant therethrough;

holding means between the casing inner surface and said core outer surface for holding the core in place said holding means being provided by at least one of the molded core binder and a preformed protrusion provided by the casing to inhibit movement of the core; and the holding means including bonding means between the inner surface of the casing and the outer surface of the core, the bonding means being provided by the desiccant core binder.

10. A filter-drier for drying refrigerant circulated in a refrigeration system by removing moisture therefrom, the filter-drier comprising:

a casing having an inlet for receiving refrigerant and an outlet for discharging refrigerant, the casing including opposed end portions and an intermediate portion disposed between said end portions and having an inner surface;

a molded core formed from dessicant and a binder disposed in said casing between said inlet and outlet and receiving flow of refrigerant therethrough;

holding means between the casing inner surface and said core outer surface for holding the core in place said holding means being provided by at least one of the molded core binder and a preformed protrusion provided by the casing to inhibit movement of the core; and the holding means being provided by a preformed protrusion extending into the outer surface of the core and bonding means between the inner surface of the casing and the outer surface of the core, said bonding means being provided by the desiccant core binder.

* * * * *